(12) United States Patent
Dague et al.

(10) Patent No.: US 8,531,453 B2
(45) Date of Patent: Sep. 10, 2013

(54) AUGMENTING VIRTUAL WORLDS SIMULATION WITH ENHANCED ASSETS

(75) Inventors: Sean L. Dague, Poughkeepsie, NY (US);
Suzanne C. Deffeyes, Austin, TX (US);
Michael C. Pitman, Wappinger Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 12/826,764

(22) Filed: Jun. 30, 2010

(65) Prior Publication Data

US 2012/0001898 A1      Jan. 5, 2012

(51) Int. Cl.
*G06T 15/00*      (2011.01)

(52) U.S. Cl.
USPC ........... 345/419; 345/473; 345/474; 345/475; 345/629

(58) Field of Classification Search
USPC ................. 345/419, 473, 474, 475, 629, 630, 345/632
See application file for complete search history.

(56) References Cited

U.S. PATENT DOCUMENTS

| | | | | |
|---|---|---|---|---|
| 7,791,606 B2 * | 9/2010 | Hadap | ........................... | 345/473 |
| 7,911,469 B1 * | 3/2011 | Baraff | ........................... | 345/474 |
| 8,154,544 B1 * | 4/2012 | Cameron et al. | ............... | 345/419 |
| 8,170,842 B2 * | 5/2012 | Ognjanovic | ....................... | 703/2 |
| 8,267,781 B2 * | 9/2012 | Geiss | ............................. | 463/32 |

OTHER PUBLICATIONS

Goldenthal et al, Efficient Simulation of Inextensible Cloth, SIGGRAPH 2007, pp. 49.1-49.8, Jul. 2007.*
Breen et al, Interactive Occlusion and Collision of Real and Virtual Objects in Augmented Reality, Technical Report ECRC-95-02, pp. 1-22, 1995.*
Nvidia Corporation, "Technical Brief NVIDIA nfinite FX Engine: Programmable Vertex Shaders," pp. 1-14, undated.
Simon Pabst, Sybille Kryzwinski, Andrea Schenk, and Bernhard Thomaszewski, "Seams and Bending in Cloth Simulation," Graphical-Interactive Systems (GRIS) Wilhelm Schickard Institute for Computer Science, Tubingen, Germany, Institute of Textile and Clothing Technology (ITB), TU Dresden, Germany, The Eurographics Association 2008.

* cited by examiner

*Primary Examiner* — Phu K Nguyen
(74) *Attorney, Agent, or Firm* — Michael J. Buchenhorner

(57) ABSTRACT

A system and method includes using a side simulation device for: receiving a scene description of a virtual world scene from a virtual world simulator, including a description of a special object that requires modification, and descriptions of other objects in an immediate vicinity of the special object; receiving a description of a desired modification to the special object; performing the modification of the special object to provide an enhanced special object such that the enhanced special object can be fully integrated with the other objects in the scene; transmitting the enhanced special object to a data store; and transmitting a proxy object signal to the simulator means to be placed in the virtual world scene to alert any viewers of the virtual world scene to refresh their view by adding the enhanced special object to their simulation by accessing the enhanced special object from the data store.

20 Claims, 5 Drawing Sheets

AUGMENTING VIRTUAL WORLDS SIMULATION WITH ENHANCED ASSETS

FIELD OF THE INVENTION

The invention disclosed broadly relates to the field of virtual world collaboration and more particularly relates to the field of augmenting virtual world collaboration with enhanced assets.

BACKGROUND OF THE INVENTION

Virtual world simulation strives for one goal—believability. Avatars and objects in a virtual world should be believable, regardless of whether or not they are patterned on real world entities that exist in "first life" or are imaginary creatures in "second life" such as the blue-skinned humanoids in James Cameron's popular 3D movie "Avatar". The major challenges in achieving believability for an avatar are the accurate and believable simulation of features such as: facial expression, hair, and cloth.

Today's state of the art for Virtual Worlds simulation relies to a great extent on the use of coarse objects (such as triangles) defined by their vertices to represent three-dimensional objects. A polygon mesh is widely used to express this 3D representation. The polygon mesh is a collection of vertices and polygons that define the shape of the object in three dimensions.

Once the shape of the object is defined, the object can be further refined in one of many processes. A vertex shader is a graphics processor that adds special effects to an object for 3D representation by changing the values of the object data. Pixel shaders are graphics processors used to compute color and other attributes such as translucency on per pixel basis.

Cloth simulation is challenging and carries a burdensome computational load, requiring mechanical computation, textile approximation, collision detection, and rendering. Because woven fabrics differ from other materials, their unique cloth geometry presents a challenge in rendering of not just the appearance, but the animation, of the cloth. In particular much research has been devoted to the accurate simulation of cloth "bending." Complex computations involving surface models of cloth, using elasticity and viscosity parameters are used to approximate the real-world draping behavior of cloth. Known methods such as the Backward Euhler method are used to simulate high-quality animated garments on virtual characters. Real time cloth cannot be computed on today's end user CPU or GPU (graphics processing unit) for significantly complex fabric because of the amount of processing power required. Client side cloth effects, hair effects, water effects, and facial feature animation and so on are currently done using Vertex Shaders on GPUs, but those are limited in their physics capabilities and do not provide the level of realism that a complex server side simulation can provide.

In order for collision detection to render a scene "believable" virtual world viewers must receive quick and regular updates from a virtual world simulator to maintain interactivity with an accurately represented scene. If updates from the physics simulation are slow (i.e. the simulation computation of a frame takes too long), end users experience lag, and collision detection errors occur in the running simulation. For instance, an error occurs when the collision between a ball that is moving towards a wall is undetected because collision checks happen too infrequently.

Referring now to the drawings and to FIG. 1 in particular, we show an avatar sitting on a piano bench. The fabric of the avatar's skirt is an example of fabric that is not collision detected against the avatar form or the piano bench. As can be seen, the fabric approximation is limited by a collision with the piano bench. The approximation of the fabric is not represented in context with its surroundings.

The film DCC (digital content creation) industry has mastered the complex modeling of cloth. This is evident in animated films such as Disney Pixar's "Ratatouille" and "UP." Using an industry rendering farm, it can take up to fifteen hours to compute the final ray traced image of each "frame" of a Pixar animated film today. Due to budgetary constraints, this level of sophistication is not found outside of the film industry. Generally speaking, combining high resolution objects used in a main simulation with extremely fine grained collision detection between those objects, together with infinite network bandwidth, requires a large budget.

A growing use of virtual world technology is in the area of virtual collaboration. Virtual collaboration allows users (employees, students, researchers) in geographically dispersed locations to collaborate on projects to achieve common goals. The medium for this collaboration is a virtual world setting. Often the users are represented as avatars and the virtual world "scene" is made to resemble a setting most familiar to the users; for example, a conference room, runway, or laboratory.

There is a need for a method to enable complex modeling of cloth for real-time applications using virtual world simulation.

SUMMARY OF THE INVENTION

Briefly, according to an embodiment of the invention a method includes steps or acts of using a side simulation device for: receiving a scene description of a virtual world scene from a virtual world simulator, said scene description including: a description of a special object that requires modification; and descriptions of other objects in an immediate vicinity of the special object within the virtual world scene; receiving a description of a desired modification to the special object; performing the modification of the special object to provide an enhanced special object such that the enhanced special object can be fully integrated with the other objects in the scene; transmitting the enhanced special object to a data store; and transmitting a proxy object signal to the virtual world simulator to be placed in the virtual world scene, the proxy object signal alerting any viewers of the virtual world scene to refresh their view by adding the enhanced special object to their simulation by accessing the enhanced special object from the data store.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
FIG. 1 shows a seated avatar as an example of an incorrect collision between the skirt fabric and the seat, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a method to augment virtual world simulation and virtual collaboration using a Virtual Worlds Physics Side Simulator. We achieve this by off-loading the burdensome computational overhead required to manage special three-dimensional (3D) data types. Special 3D data types, as used throughout this document, refer to any data types such as cloth and hair that require special modeling (additional physics computation).

Distributed System.

Our new paradigm for virtual world simulation adds a Side Simulation Engine, a Proxy Object Interface, and an Enterprise Database to handle these data types, thus easing the burden on the Virtual Worlds Simulator. Cloth computation is several orders of magnitude more complex than the typical collision detection between objects in a Virtual Worlds Simulation, and also contains proprietary algorithms and data, thus we offload it.

This method addresses some of the previously described limitations in physics simulation without introducing lag or error into the main simulation. We extend the viewer's 3D visual capabilities beyond the currently supported protocol, while providing a side channel of integrated 3D data to clients in the simulation. By integrated we mean the side simulation is computed such that it is integrated into the live scene in the main simulation. The output from the side simulation is preferably a 3D mesh. This 3D mesh is uploaded to the Enterprise DB so that it can be integrated into the scene at a user's request. The 3D mesh approximates the cloth within the virtual worlds scene. The Side Simulation Engine computes the cloth so that it drapes properly over objects in the main scene (like a chair the avatar is sitting in) and thus is integrated. An additional output from the side simulation is a proxy object signal transmitted to the Virtual Worlds Simulator for displaying a proxy object to the virtual world clients.

Although the method as described herein has broader-reaching applications, we will focus our discussion on cloth simulation, while realizing that the methods as discussed herein are also suitable for realistic simulations of hair, skin, facial expressions, and other objects. Additionally, the method can be used to generate other types of data such as two-dimensional (2D) image data such as texture maps.

Currently, realistic cloth simulation cannot be done in a Virtual World Simulator without adversely affecting its performance. In enhancing the simulation using a side channel, we are able to retain the known protocol (the client simulator protocol) between the Virtual World Simulator and connected clients (viewers) without comprising performance. Additionally, this method avoids adding foreign data types into the Virtual World Simulator by requiring the use of a Side Simulator and database, thus restricting a user from uploading any foreign data types into the Virtual World Simulator.

It should be noted that side simulation of objects other than cloth also have performance issues that are the same or similar to those performance issues associated with cloth modeling, and so they can also be supported with our invention. Any application that needs to integrate higher fidelity visual effects into a virtual world simulator, or that needs to enhance the running physics simulation with additional computation, can benefit from this invention.

Figure 2:
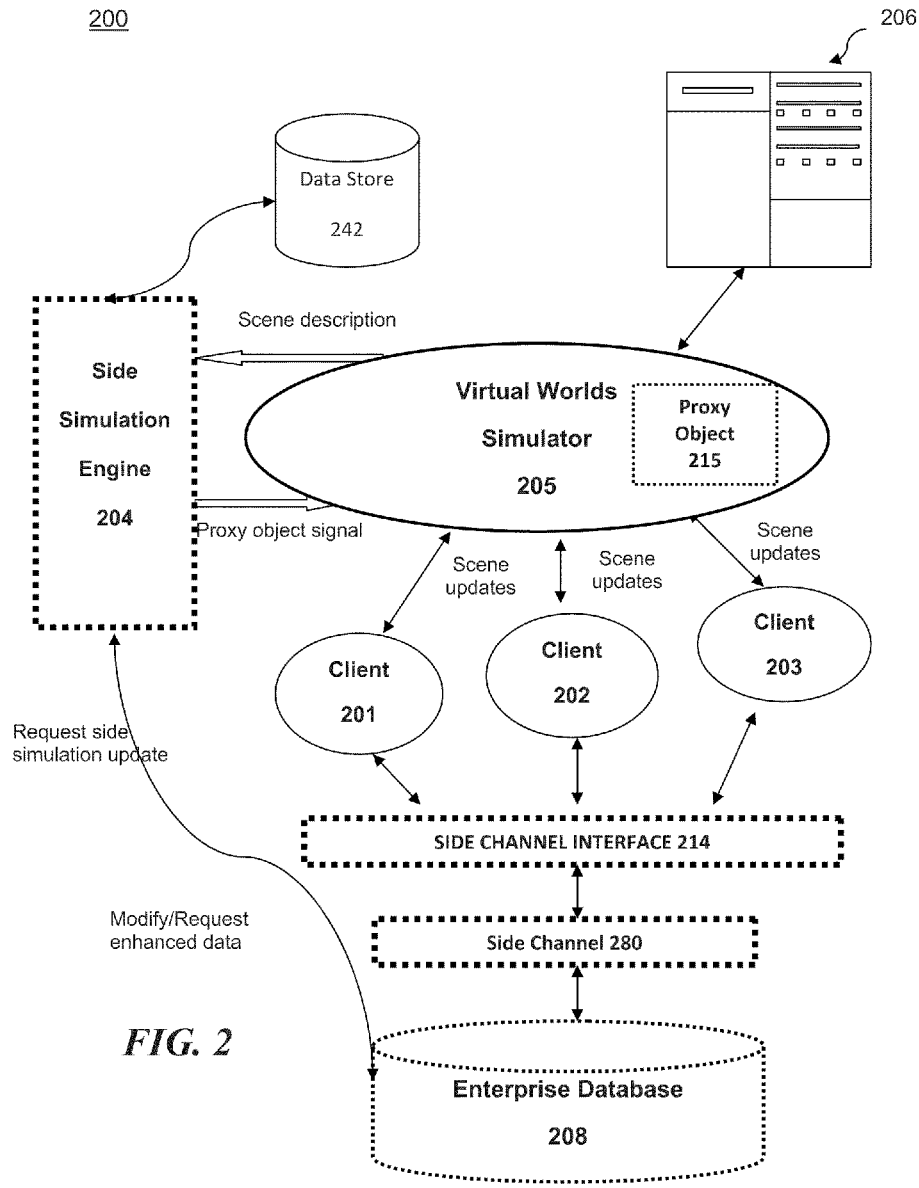
FIG. 2 is a high level block diagram showing a virtual world system, according to an embodiment of the present invention.

Referring now to FIG. 2, we show a simplified diagram of a Virtual Worlds Enhanced System 200, according to an embodiment of the present invention. A running Virtual Worlds Simulator 205 and Virtual Worlds Asset Server (206) and connected Clients (also called viewers) 201-203 are part of known systems. We introduce an Enterprise Database 208 and Side Simulation Engine 204, both shown in dotted lines, and a Side Channel Interface 214, and the mechanisms needed to support the system 200. Clients 201-203 all connect to the Virtual Worlds Simulator 205 and communicate using a standard protocol defined by the Virtual Worlds provider (the simulator client protocol) such as the second life protocol.

In an embodiment of the present invention, the Clients 201-203 can be any number and/or configuration of entities (individual users, user groups, businesses, local area networks, and so forth). Each Client can be represented within the main scene as an avatar and interact within the framework of a virtual collaboration.

A server-side Side Simulation Engine 204 is preferably a multi-processor device, graphics processor (GPU) device or another device of equivalent capabilities for enabling the computation of cloth of a realistic visual quality. The Side Simulation Engine 204 computes the cloth simulation accurately so that it can be integrated with the 'live' scene (the main scene) relayed by the Virtual Worlds Simulator 205. This integration into the main scene includes collision detection.

The Side Simulation Engine 204 has access to the data sources that it needs to perform its computations, such as the Enterprise Database 208 and other data stores 242, and those data sources do not have to be shared with all of the Clients 201-203 associated with the collaboration. This simulation service concept is also applicable to other virtual objects that are difficult and computation-intensive to generate in a main simulation, but can add additional visual fidelity at the client view.

According to a preferred embodiment of the present invention, collision checking is distributed between the Virtual Worlds Simulator 205 and the Side Simulation Engine 204. The Virtual Worlds Simulator 205 performs rough collision detection on all of the less computationally-intensive objects in the scene. These are the objects that do not require special handling.

In order for the off-loaded computation to take place, the Side Simulation Engine 204 receives a scene description of the normal scene objects from the Virtual World Simulator 205 that are in the immediate vicinity of an object identified as a "special object" or first object such as cloth, as well as a place keeper or proxy object for the special object to be simulated. The "special object" is any object in a scene that requires additional physics computation. This additional computation may be collision detection, or other physics computation that adds visual fidelity. The Side Simulation Engine 204 also receives, from the client-side, a set of object definitions for updating the special object. This set of object definitions is transmitted through a side channel interface 214 using a side channel 280 for linking the Clients 201-203 to the Side Simulation Engine 204. The interface 214 can function as a simple object access protocol (SOAP) interface.

The Side Simulation Engine 204 can also retrieve any other data it needs to perform the computations from other data stores 242. Then the Side Simulation Engine 204, using the set of object definitions received from the client-side, computes the cloth physics such that the cloth is properly collision-detected and integrated into the main scene, as viewed by Clients 201-203.

In a preferred embodiment of the present invention, the output from the Side Simulation Engine 204 to the Enterprise DB 208 is a 3D mesh that is later integrated into the main scene at the request of a client. In this example, by integrated we mean that the 3D mesh representation of the cloth appropriately relates to another object in the scene. Following the example of FIG. 1, the 3D mesh representation from the side scene drapes appropriately over the piano bench in the main scene, and thus becomes integrated with the main scene. The 3D mesh can be made up of groups of meshes with constant connectivity over a period of time within each group of meshes. Additionally, the Side Simulation Engine 204 can also perform other enhancements to further improve the realistic approximation of the special object.

Proxy Object.

Figure 3:
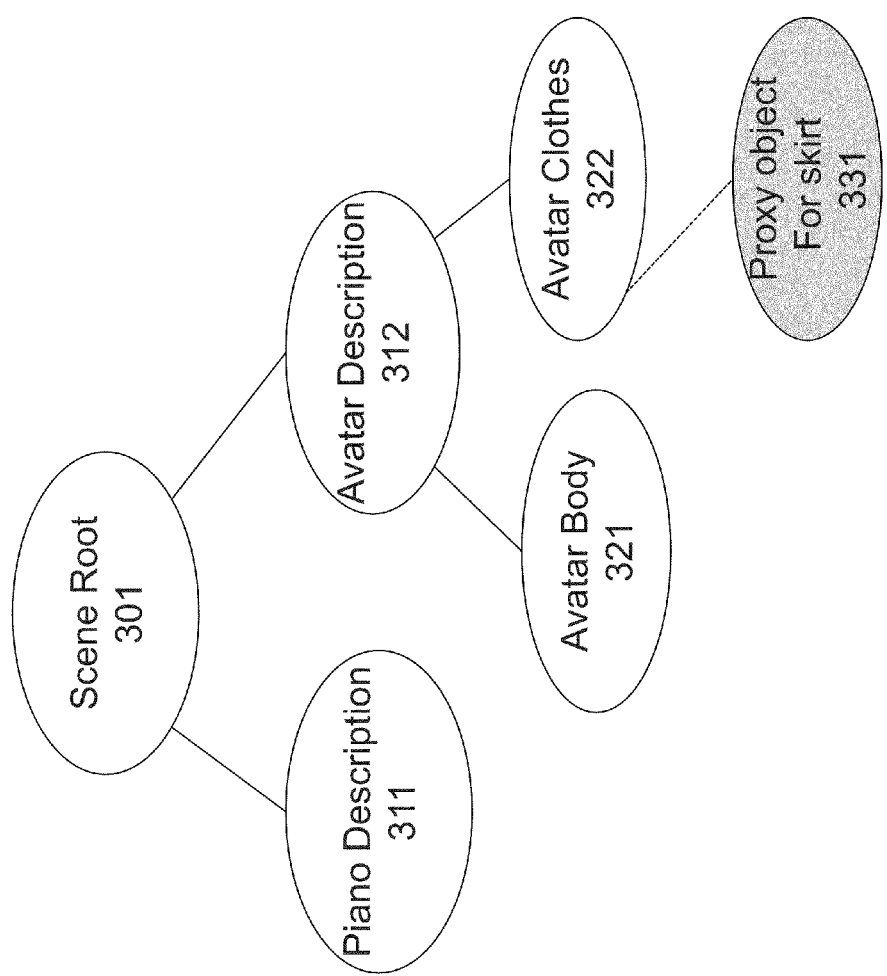
FIG. 3 is an exemplary data model of the scene depicted in FIG. 1.

Referring now to FIG. 3 we show a simplified high-level data model 300 for the scene depicted in FIG. 1, rooted at Scene Root 301. Scene Root 301 has two leaf nodes in this simplified model: a Piano Description node 311 and an Avatar Description node 312. The Avatar Description node 312 has two leaf nodes, the Avatar Body node 321, and the Avatar Clothing node 322. It should be noted that this data model 300 is shown for exemplary purposes only. One with knowledge in the art will appreciate that data models in actual virtual world simulations will be much more complex.

We introduce the use of a proxy object signal 331 in the main simulation scene 300 as a signaling mechanism to ensure that all viewers (clients) of the simulation 300 are apprised of updates to the special object which, in this case, is the skirt. In a fashion design collaboration, the avatar would be working on a garment draped on a humanoid figure.

The proxy object signal 331 is output from the Side Simulator 204 to the Virtual Worlds Simulator 205 which in turn relays this signal 331 embedded into the main scene as the proxy object 215. The proxy object 215 can be perceived by the Clients 201-203 in many different forms within the spirit and scope of the invention. Through this proxy object 215, the Clients 201-203 will be made aware that updates to the special object or other objects within the main scene are available and can be uploaded from the DB 208. Each Client 201-203 then has the option to select the update and can even further comment on and/or modify the update.

The Client 201 requests an update to the main scene through the side channel interface 214. The interface may be implemented on the client system as a toolbar. Through this interface 214 the Client 201 will select the object to be updated and provide a description of the update to the Enterprise DB 208. This description can be in a form of a data model definition or any other format acceptable to the Side Simulator 204.

Once computed at the Side Simulator 204, the update is not directly integrated into the Virtual Worlds server simulation (the main scene) by the Side Simulation Engine 204; instead, the proxy object signal 331 is transmitted to the Virtual Worlds server simulation 205. Once the Clients 201-203 perceive this signal (as the proxy object 215) in their view of the main scene, the Clients 201-203 are able to upload the update from the DB 208. Once uploaded, the update is incorporated into the main scene view of whatever Client requested it. It is possible for one client to request an update and not the other clients. In this case, the view of the main scene on the viewer of the requesting Client will be different from the view of the main scene as seen by the other clients.

The update is provided to the viewer by the Enterprise DB 208 through a separate side channel 280 that is used to download enhanced data to the viewer. The side channel 280 is a communication channel integrated with the interface 214. This allows the Clients 201-203 to integrate special 3D data types into the running Virtual Worlds Simulator 205 without affecting its performance or the client's virtual experience.

The proxy object 215 serves as a marker in the main scene that indicates to a viewer that an object is being generated by a side simulation. When a Client perceives a proxy object 215 from the Virtual Worlds Simulator 204 on his/her screen, the Client is able to retrieve that object 215 through the side channel 280. The proxy object 215 is a way to signal all connected clients where (and when) a side service computed object exists. Thus the proxy object 215 helps coordinate between the existing Virtual Worlds Simulator 205, the novel Side Simulation Engine 204, and all the Clients 201-203 that are connected to a Virtual Worlds Simulator 205 and participating in the collaboration session. In the example of FIG. 1, the proxy object signal 215 is added whenever the skirt cloth simulation is running in the side simulation.

The Clients 201-203 are able to view the enhanced object as integrated in the Virtual Worlds Simulator 205 main scene using the standard protocol understood by the Virtual Worlds Simulator 205. The proxy object signal 331 follows a known Client-Simulator protocol, but uses an unused tag or flag in the protocol as a flagpole to indicate to the client the availability of an update that needs to be fetched using the side channel (Enhanced Data Download) 280.

After the proxy object signal 331 has been transmitted to the Virtual Worlds Simulator 205, all Clients 201-203 receive notification that a new object is available for viewing in the Virtual Worlds Simulator 205. When the Clients 201-203 process that object notification, the Clients 202, 203 fetch the update from the Enterprise Database 208 through the side channel 280. The data fetched from the Enterprise Database 208 contains a visual description of the results of the Side Simulation Engine 204. For instance, in the case of the skirt on the sitting avatar in FIG. 1, it will be a visual description (typically a 3D mesh) of the skirt's position in the scene. The skirt will be properly draped on the sitting avatar and the bench instead of hanging below the avatar.

In a virtual collaboration, users are represented as avatars in the main scene and the desired interaction among the users if they were face-to-face is represented by the interaction among their avatars in the main scene. Embodiments of the present invention are particularly suited to virtual collaboration because of the ability of different users to collaborate on modifications to an object in a virtual world scene.

For example, according to an embodiment of the present invention, Client 201 requests an update to a special object. Assume Client 201 orders an update to the garment worn by an avatar in the main scene. This update may be a perceived improvement in the appearance of the object in the main scene or it may be an approximation of a repair/modification to an actual object in real life. For example, assume a virtual collaboration where remotely located engineers are attempting to improve upon or repair an object represented in a virtual world scene. Client 201 uses the interface 214 to request an update to the designated object in the main scene by identifying the special object to be updated, and through the same interface 214, transmits a description of the update to the database 208.

The database 208 in turn attempts to locate this update to return it to the Client 201. If the update is not already stored in the DB 208 it will have to be generated. The DB 208 queues a request for an update computation to the Side Simulation Engine 204. If needed, the Side Simulation Engine 204 queries the small portion of the closest scene data from the Virtual Worlds Simulator 205. The Side Simulation Engine 204 queries additional data it needs from the Enterprise Database 208 or from other sources, and performs its computation.

The results of the computation are placed back into the Enterprise Database 208 where it is retrieved by the Client 201 and incorporated into that client's view, prompting the Side Simulation Engine 204 to transmit the proxy object signal 331 to the Virtual Worlds Simulation Server 205 to notify any connected clients to refresh their view by requesting the update. Note that when Clients 202 and 203 request the update from the DB 208, no additional computation is necessary since the update has already been computed and is stored in the DB 208. The update will be provided to the Clients 202 and 203 for incorporation into their view. Note that regardless of whether it is Client 201 requesting an update that needs to be computed, or Client 202 requesting an update that needs no computation and is available in the DB 208, all clients will perceive the transaction in the same manner because the computation that occurs in the Side Simulator 204 is transparent to the Clients 201-203. For any client requesting an update, the transaction will be perceived by that client in the manner of a query/response.

Figure 4:
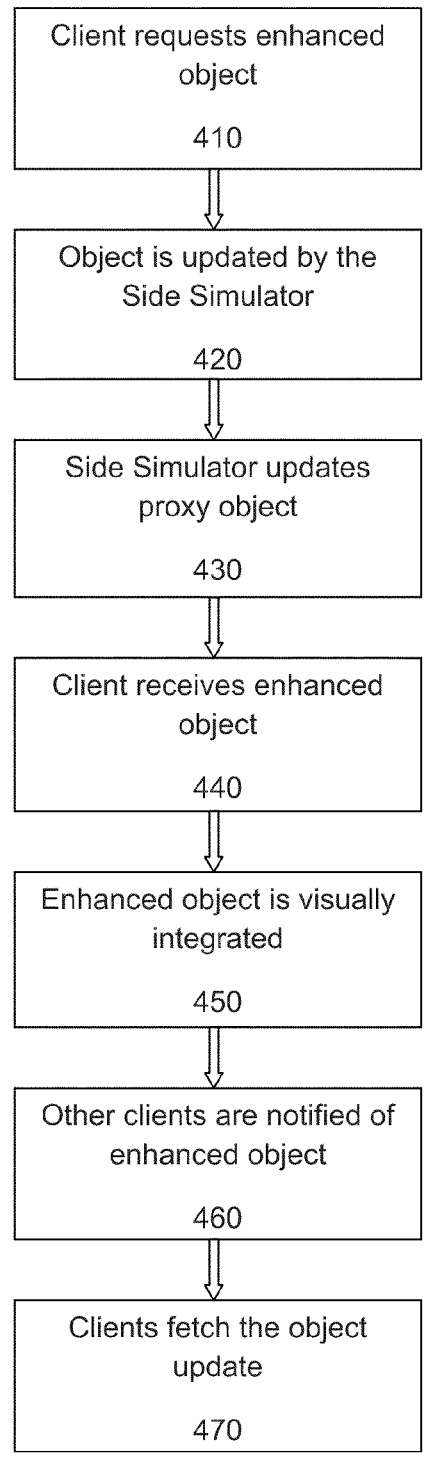
FIG. 4 is a flowchart of a method according to an embodiment of the present invention.

FIG. 4 shows a high-level flowchart of the steps for object enhancement, according to an embodiment of the present invention. First in step 410 Client 201 desires to modify/enhance an object to the main scene relayed by the Virtual Worlds Simulator 205 as viewed in the client's viewer. Client 201 requests the object enhancement from the Enterprise DB 208 through the interface 214. If the object enhancement is already available, it is promptly transmitted to the Client 201 and uploaded to the client's viewer. It is assumed that the two-way communication channel 280 has already been opened and the interface 214 has been installed and activated on the client computer.

If the object enhancement is not available in the DB 208, in step 420 the object is updated by the Side Simulation 204. Once updated, in step 430 the Side Simulation 204 provides an update signal to the Virtual Worlds Simulator 205, before the object enhancement is passed back to the Client 201 through the Enhanced Data Download in step 440. Simultaneously, the update is visually integrated into Client 201's view in step 450.

In step 460 the other Clients 202, 203 receive a proxy object notification from the Virtual Worlds Simulator 205 in the form of an update signal 331. This proxy object notification (the update signal) informs all clients that are part of this collaboration, that an update is available. In order for the other Clients 202, 203 to receive the enhancement in their view, in step 470 the clients 202, 203 fetch the object update from the Enterprise Database 208 through the side channel. Once fetched, the object update is incorporated into the Clients' 202, 203 view.

In embodiments of the present invention, a client does not generate an update on its own. Instead, a client can only request an update (such as re-computation of cloth) through the proxy object interface 214. The client sends object definitions describing the update it would like to the DB 208. For example, Client 201 may request a change to the color and/or pattern of the skirt shown in FIG. 1. The Client 201 sends an update request that will result in the cloth needing to be recomputed in the Side Simulator 204. Once an update is available and all clients within the collaboration are made aware of the update, the clients can provide feedback on the update. The clients may also provide additional modifications to the update. The additional modifications are processed in the same manner as the original update. Since the updates are stored in the DB 208, a fallback to a previous update (or the original object) is readily available and requires no further computation.

Hardware Implementation.

Figure 5:
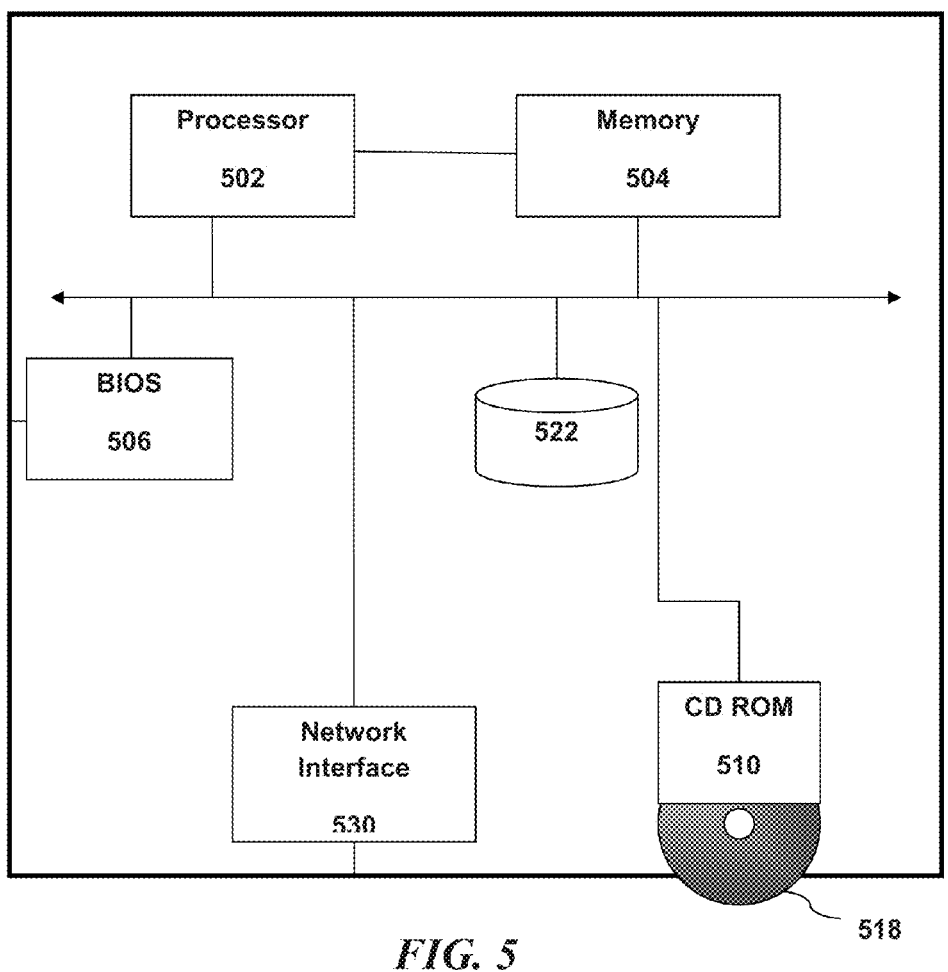
FIG. 5 is a simplified block diagram of a computer program product configured to operate according to an embodiment of the present invention.

Referring to FIG. 5, there is shown a block diagram of an information handling system 500 consistent with an embodiment of the present invention. For purposes of this invention, computer system 500 may represent any type of computer, information processing system or other programmable electronic device, including a client computer, a server computer, a portable computer, an embedded controller, a personal digital assistant, and so on. The computer system 500 is preferably networked into a collaboration network.

The system 500 may include a number of operators and peripheral devices as shown, including a processor device 502, a memory 504, and an input/output (I/O) subsystem 506. The processor 502 may be a general or special purpose microprocessor operating under control of computer program instructions executed from a memory. The processor may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips. The memory may be partitioned or otherwise mapped to reflect the boundaries of the various memory subcomponents.

The memory 504 represents either a random-access memory or mass storage. It can be volatile or non-volatile. The system 500 can also include a magnetic media mass storage device such as a hard disk drive 522. The I/O subsystem 506 may include various end user interfaces such as a display, a whiteboard, keyboards, mouse, stylus, and a mouse, among others. The I/O subsystem 506 may further include a connection to a network such as a local-area network (LAN) or wide-area network (WAN) such as the Internet. A network interface 530 may enable a wired or wireless connection. Processor and memory components are physically interconnected using a conventional bus architecture.

Removable storage unit 518, represents a compact disc, digital video disk, magnetic tape, optical disk, inter alia, which is read by and written to by removable storage drive 510. As will be appreciated, the removable storage unit 518 includes a computer readable storage medium having stored therein computer program instructions and/or data. The computer program instructions instruct the system 500 on performing a method according to an embodiment of the invention.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method comprising steps of:
    using a side simulation device in operative communication with a virtual world simulator device, said side simulation device performing:
        receiving from the virtual world simulator device a scene description of a virtual world scene from a virtual world simulator, said scene description comprising: a description of a special object that requires modification; and descriptions of other objects in an immediate vicinity of the special object within the virtual world scene;
        wherein the virtual world simulator is engaged with connected clients using a client simulator protocol;
        receiving a description of a desired modification to the special object through a side channel interface operatively coupled with the side simulation device;
        performing at the side simulator device the modification of the special object to provide an enhanced special object such that said enhanced special object can be fully integrated with the other objects in the scene;
        transmitting the enhanced special object to a data store; and
        transmitting a proxy object signal to the virtual world simulator to be placed in the virtual world scene, said proxy object signal alerting any viewers of the virtual world scene to refresh their view by adding the enhanced special object to their simulation by accessing said enhanced special object from the data store.

2. The method of claim 1 wherein transmitting the proxy object signal comprises embedding the proxy object signal in an unused tag associated with the client simulator protocol.

3. The method of claim 1 wherein performing the modification comprises querying the virtual world simulator for additional data.

4. The method of claim 1 wherein performing the modification of the special object comprises performing the modification of a three-dimensional data type.

5. The method of claim 4 wherein performing the modification comprises using three-dimensional polygonal mesh modeling.

6. The method of claim 1 wherein performing the modification comprises performing a collision detection process.

7. The method of claim 1 wherein the step of transmitting the proxy object signal comprises transmitting said proxy object signal within the client simulator protocol used by the virtual world simulator.

8. The method of claim 1 further comprising falling back to a state of the special object before modification while maintaining the enhanced special object in the data store.

9. The method of claim 1 wherein receiving the description of the desired modification comprises receiving a data object definition from the data store.

10. A machine for virtual world simulation, said machine comprising:
    a virtual world simulator for providing a virtual world scene to a viewer;
    a virtual world asset server operatively coupled with the virtual world simulator;
    a data store;
    a side simulator engine operatively coupled with the virtual world simulator by a two-way communication channel, said side simulator engine performing:
        receiving a scene description of the virtual world scene from the virtual world simulator, said scene description comprising: a description of a special object that requires additional computation; and descriptions of other objects in an immediate vicinity of the special object;
        performing a modification of the special object to provide an enhanced special object such that said enhanced special object can be fully integrated with the other objects in the scene;
    transmitting the enhanced special object to the data store; and
    transmitting a proxy object signal to the virtual world simulator to be placed in the virtual world scene, said proxy object signal alerting viewers of the virtual world scene to refresh their view by adding the enhanced special object to their simulation by accessing said enhanced special object from the data store;
    a side channel interface between the viewers and the data store; and
    a two-way communication channel between the side channel interface and the data store.

11. The system of claim 10 wherein the special object is a three-dimensional data type.

12. The system of claim 11 wherein the three-dimensional data type is a cloth simulation.

13. The system of claim 10 wherein the side channel interface comprises a toolbar.

14. The system of claim 10 wherein the two-way communication between the side channel interface and the data store follows a simple object access protocol.

15. The system of claim 10 wherein the additional computation comprises collision detection.

16. A non-transitory computer program product with computer program instructions embodied therein, said computer program instructions causing a computer to perform steps of:
    using a side simulation device in operative communication with a virtual world simulator, said side simulation device performing:
        receiving a scene description of a virtual world scene from the virtual world simulator, said scene description comprising: a description of a special object that requires modification; and descriptions of other objects in an immediate vicinity of the special object within the virtual world scene;
        wherein the virtual world simulator is engaged with connected clients using a client simulator protocol;
        receiving a description of a desired modification to the special object through a side channel interface operatively coupled with the side simulation device;
        performing the modification of the special object to provide an enhanced special object such that said enhanced special object can be fully integrated with the other objects in the scene;
        transmitting the enhanced special object to a data store; and
        transmitting a proxy object signal to the simulator means to be placed in the virtual world scene, said proxy object signal alerting any viewers of the virtual world scene to refresh their view by adding the enhanced special object to their simulation by accessing said enhanced special object from the data store.

17. The computer program product of claim 16 wherein the computer program instructions further cause the computer to perform a step of:
    embedding the proxy object signal in an unused tag associated with the client simulator protocol.

18. The computer program product of claim 16 wherein the computer program instructions further cause the computer to perform a preliminary step of:
  opening a two-way communication channel with the viewer; and
  activating an interface on a computer operated by the viewer, wherein said interface enables the viewer to provide the description of the desired modification.

19. The computer program product of claim 16 wherein the computer program instructions further cause the computer to perform a step of:
  falling back to a state of the special object before modification while maintaining the enhanced special object in the data store.

20. The computer program product of claim 16 wherein performing the modification comprises performing a collision detection process.

\* \* \* \* \*